US007869360B2

United States Patent
Shi

(10) Patent No.: US 7,869,360 B2
(45) Date of Patent: Jan. 11, 2011

(54) METHOD AND APPARATUS FOR SAVING POWER ON A DIGITAL SUBSCRIBER LINE

(75) Inventor: Qingquan Shi, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 142 days.

(21) Appl. No.: 12/207,079

(22) Filed: Sep. 9, 2008

(65) Prior Publication Data

US 2009/0022213 A1    Jan. 22, 2009

Related U.S. Application Data

(63) Continuation of application No. PCT/CN2007/000747, filed on Mar. 8, 2007.

(30) Foreign Application Priority Data

Mar. 9, 2006  (CN)  .................. 2006 1 0056892

(51) Int. Cl.
H04L 12/26 (2006.01)
G06F 11/00 (2006.01)
(52) U.S. Cl. ................ 370/231; 370/235; 370/485; 375/222
(58) Field of Classification Search ......... 370/230–235, 370/311, 395.6, 401, 412, 485–487, 493–495, 370/522; 375/219–222
See application file for complete search history.

(56) References Cited

U.S. PATENT DOCUMENTS 6,351,509 B1 * 2/2002 Vitenberg et al. ........... 375/377
6,549,520 B1 * 4/2003 Gross et al. .................. 370/242
6,721,355 B1 * 4/2004 McClennon et al. ........ 375/222
7,406,052 B2 * 7/2008 Suciu et al. .................. 370/252
7,826,338 B2 * 11/2010 Zhou ........................ 370/201
2003/0099286 A1 * 5/2003 Graziano et al. ............ 375/222

(Continued)

FOREIGN PATENT DOCUMENTS

CN        1575566        2/2005

(Continued)

OTHER PUBLICATIONS

Supplementary European Search Report issued in corresponding European Patent Application No. 07 72 0352; issued Aug. 26, 2009.
Written Opinion of the International Searching Authority issued in corresponding PCT Application No. PCT/CN2007/000747; mailed Jun. 14, 2007.

(Continued)

Primary Examiner—Tri H Phan
(74) Attorney, Agent, or Firm—Brinks Hofer Gilson & Lione

(57) ABSTRACT

A method for saving power on a digital subscriber line (xDSL) includes: generating a statistic on data rates on the xDSL, adjusting the line rate and the transmit power on the xDSL according to the statistic result, and updating the line rate of an xDSL transceiver according to the adjusted line rate and transmit power. An apparatus for saving power on an xDSL includes a data rate statistics unit, a line rate adjustment policy unit, a line parameter adjusting unit, and a line rate updating unit for an xDSL transceiver. According to the embodiments of the present invention the average transmit power of the xDSL line can be reduced effectively and energy can be saved.

12 Claims, 4 Drawing Sheets

U.S. PATENT DOCUMENTS

| | | |
|---|---|---|
| 2003/0108191 A1 | 6/2003 | Kerpez |
| 2005/0123028 A1 | 6/2005 | Cioffi et al. |
| 2005/0213405 A1 | 9/2005 | Stopler |
| 2008/0205609 A1* | 8/2008 | Zhou ..................... 379/93.08 |

FOREIGN PATENT DOCUMENTS

| | | |
|---|---|---|
| CN | 1640183 | 7/2005 |
| GB | 2 337 672 A | 11/1999 |
| WO | 00/52894 | 9/2000 |
| WO | 03/034185 A2 | 4/2003 |

OTHER PUBLICATIONS

Office Action issued in corresponding Chinese Patent Application No. 200610056892.2; issued Dec. 11, 2009.

International Search Report issued in corresponding Chinese Patent Application No. PCT/CN2007/000747; Mailed Jun. 14, 2007.

* cited by examiner

US 7,869,360 B2

METHOD AND APPARATUS FOR SAVING POWER ON A DIGITAL SUBSCRIBER LINE

CROSS-REFERENCES TO RELATED APPLICATIONS

This is a continuation of PCT application No. PCT/CN2007/000747, filed Mar. 8, 2007, and entitled, "Method and Apparatus for Saving Power on a Digital Subscriber Line", which claims priority to the Chinese Patent Application No. 200610056892.2, filed with the Chinese Patent Office on Mar. 9, 2006 and entitled "Method and Apparatus for Saving Power on a Digital Subscriber Line", the contents of both of which are incorporated herein by reference in their entirety.

FIELD OF THE INVENTION

The present invention relates to communication technologies, and in particular, to a digital subscriber line transmission technology, and more particularly, to a method and apparatus for saving power on a digital subscriber line.

BACKGROUND OF THE INVENTION

Digital subscriber line (xDSL) is a high-speed data transmission technology for transmitting data on a telephone twisted pair. Except for the baseband DSL, such as ISDN digital subscriber line (IDSL, at a transmission rate of 144 Kbps) and single-line high bit rate digital subscriber line (SHDSL), the passband xDSL uses the frequency division multiplexing technology to allow e the xDSL to coexist with the plain old telephone service (POTS) on a twisted pair. The xDSL occupies the high band, and the POTS occupies the baseband part below 4 KHz. The POTS signals are separated from the xDSL signals through a splitter. The passband xDSL adopts discrete multi-tone (DMT) modulation. A DSL access multiplexer (DSLAM) system provides multiple channels of xDSL access. A reference model of the DSLAM system is shown in FIG. 1.

In FIG. 1, NMS represents a network management system, xTU-C represents a transmission unit of the xDSL at an access point, xTU-R represents a transmission unit of the xDSL at the far end, and Splitter is a filter that separates high-frequency xDSL signals from low-frequency POTS signals.

When the xDSL is activated, a certain rate is determined, for example, a downlink rate of 2 Mbps. When an xDSL transceiver is operating in a training mode, a line rate is determined according to the line conditions, for example, 4 Mbps. Once determined, the line rate is constant in the actual operation of the xDSL, regardless of the service data rate. Technically speaking, to keep a constant line rate, the transmit power on the line must keep unchanged.

The data traffic on the line varies greatly, depending on the time period in a day and the type of the service on the network. In most cases, the average data rate is lower than the line rate. When the line is idle, the data rate is zero. Therefore, if the transmit power on the line remains unchanged in any case, a waste of power occurs when the line data rate is low or zero. To reduce energy consumption, the prior DSL standards provide three operating modes: L0 mode (full power mode), L2 mode (low data rate state), and L3 (sleep state).

L0 is a normal operating mode. The L0 keeps the line rate unchanged and provides the adaptation functions such as seamless rate adaptation (SRA) and bit swap but does not provide energy efficiency. L2 is a low power consumption mode and provides no adaptation functions. L3 is an idle mode and cannot provide data services. When the data transmission rate is moderate, the xTU-C or the xTU-R may request to enter the L2 mode to reduce the transmit power of the power supply and save energy at the cost of reducing the transmission rate. After the line enters the L3 mode, because L3 is an idle mode which provides no data transmission service and does not need to send signals, the energy efficiency is the highest but no data transmission is available. For example, when the line is in the full rate state (for example, the user is downloading a large video file), to ensure fast and accurate data transmission, the ADSL2 system works in the L0 full power mode. When the line rate is low (for example, the user is reading a document online), the transceiver power is adjusted to the L2 low energy consumption mode automatically. When the user logs out, the system shifts to the sleep state quickly and the transceiver power is adjusted to the L3 low energy consumption mode. In other words, according to the actual data traffic on the line, the transmit power may be selectively switched between L0, L2 and L3 Switching operations are finished within 3 seconds to avoid affecting the services.

The prior xDSL standards provide the three modes primarily to save energy, but the modes are defective in some aspects. First, the modes are categorized roughly and cannot meet the actual requirements, and therefore the effect of energy saving is not apparent. Second, the L2 mode saves energy at the cost of reducing the transmission rate. Therefore, the practicality of utilizing the L2 mode is minimized and not applicable to most services due to transmission rate requirements. Moreover, the switching between the modes is rather complicated and time-consuming.

SUMMARY

An embodiment of the present invention provides a method and apparatus for saving xDSL power, further improving the energy efficiency of the xDSL line and making the xDSL line more widely applicable.

As a result, the xDSL line can better meet the requirements of various service rates and reduce the energy consumption.

An embodiment of the present invention provides a method for saving xDSL power that includes generating a statistic on data rates on the xDSL, adjusting the line rate and the transmit power on the xDSL according to the statistic result, and updating the line rate of an xDSL transceiver according to the adjusted line rate and transmit power.

In other embodiments, an apparatus for saving xDSL power includes a data rate statistics unit adapted to generate a statistic on data rates on the xDSL, a line rate adjustment policy unit adapted to set a line rate adjustment policy, a line parameter adjusting unit adapted to adjust at least one of the line rate or the transmit power according to the statistic result of the data rate statistics unit and the line rate set by the line rate adjustment policy unit, and a line rate updating unit for an xDSL transceiver, adapted to update the line rate of the xDSL transceiver through the online reconfiguration (OLR) function according to the adjusted line rate and transmit power.

In the technical solution provided by the embodiments of the present invention, when the xDSL transceiver operates normally, the system generates statistics on data traffic in real time and updates the transmit power of the line and the line rate dynamically through the OLR function according to the statistic results, thus keeping the transmit power of the line on a proper level. In most cases, the average data rate of the xDSL is far lower than the line rate when the line is activated. Therefore, the embodiments of the present invention can reduce the transmit power without affecting the user experience. The embodiments of the present invention not only reduces the transmit power and saves energy, but also reduces crosstalk on other lines.

DETAILED DESCRIPTION

In the technical solution provided by embodiment of the present invention, when the xDSL transceiver operates normally, the system updates the transmit power of the line and the line rate dynamically according to the data traffic by using the online reconfiguration (OLR) feature, thus keeping the transmit power of the line on a proper level rather than always transmitting data at the maximum power.

To help those skilled in this field better understand the technical solution of the present invention, the present invention is hereinafter described in detail by reference to embodiments and accompanying drawings.

Figure 1:
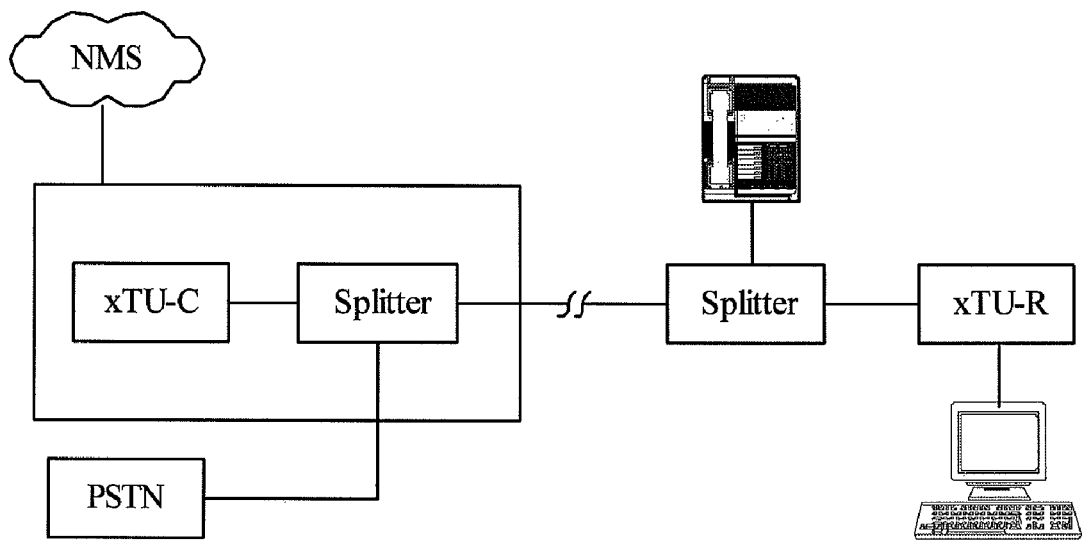
FIG. 1 shows a reference model of the xDSL system according to the prior art.
Figure 2:
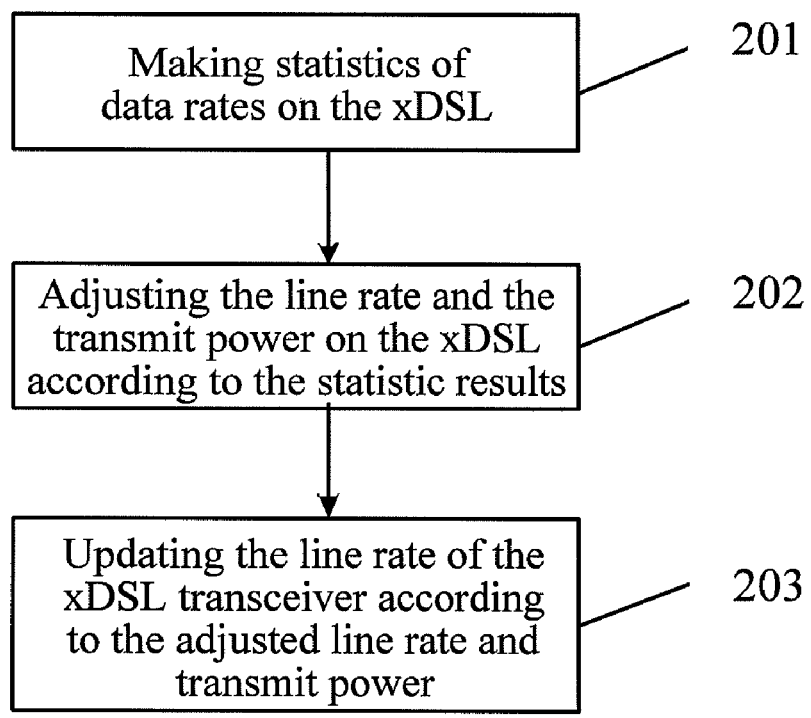
FIG. 2 is a flowchart of the method for saving power according to an embodiment of the present invention.

FIG. 2 shows the process of the method for saving xDSL power according to an embodiment of the present invention. In Step 201, statistics on data rates on the xDSL are generated. The protocol model of the xDSL transceiver is divided into three sublayers on the physical media: transport protocol specific—transmission convergence (TPS-TC) sublayer, physical media specific—transmission convergence sublayer, and physical media dependent (PMD) sublayer. The TPS-TC sublayer adapts to the upper-layer transport protocol in three modes: synchronous transfer mode (STM), asynchronous transfer mode (ATM), and packet transfer mode (PTM). The TPS-TC sublayer provides functions such as rate adaptation, frame delimitation, and error monitoring. This sublayer depends on the upper layer protocol but is independent of the features of the signals on the physical media. The PMS-TC sublayer is used to strengthen the capability of transmitting xDSL data streams on the physical media and provides the functions of frame alignment, scrambling, forward error correction (FEC) and interleaving. This sublayer depends on the physical layer media but is independent of the applications (upper-layer protocol). The PMD sublayer includes electrical features, coding, modulation, and duplex mode of the transmitted signals.

Those skilled in the art will appreciate that on the xDSL, when the data rate is lower than the line rate, the TPS-TC sublayer of the xDSL will insert different idle data based on different data transport protocols so that there is always data transmitted on the line. Therefore, the statistics on data rates can be made according to the percentage of idle data (ID) bytes to non-idle data (UD) bytes in a time period (t). If the ATM protocol is used, the number of bytes contained in each frame is the same so it is only necessary to generate statistics on idle frames.

For example, if the current line rate is Rline, then the data rate can be obtained through the following formula:

$$R_{data} = R_{line} \times \frac{UD}{ID + UD}$$

In fact, if ID=0, it is possible that Rdata>Rline.

The average value of the data rates observed a continuous preset number of statistics observance times (for example, three times) can be utilized as the current data rate, so that rate adjustment will not cause fluctuation.

If Rdata exceeds the Rline, the xDSL transceiver sends a stop-write message to the upper-layer entity requesting to stop writing data into the buffer. When the data in the buffer is decreased to a low level, the xDSL sends an allow-write message to the upper-layer entity, thereby allowing writing data into the buffer. In this way, the system can estimate the difference between Rdata and Rline according to the number of stop-write messages sent from the TPS-TC to the upper-layer entity in a time period (t).

In Step 202 the line rate and the transmit power on the xDSL is adjusted according to the statistic results.

The system can preset a line rate adjustment policy to generate real-time statistics on the line rate and then check whether the obtained statistic results meet the conditions of the set line rate adjustment policy. If the statistic results meet the conditions of the adjustment policy, the system updates the corresponding bit entry and gain entry according to the adjustment policy, thus changing the line rate and the transmit power. The line rate adjustment policy may be set as required so that the transmit power on the line suits the actual data rate, thus keeping the line rate always at a proper level.

For example, the statistics on data rates are generated periodically. According to the statistic results, if the current data rate is lower than the current line rate, the current line rate will be decreased. If the current data rate is higher than or equal to the current line rate, the current line rate will be increased.

In another example, a decrease tolerance and an increase tolerance are set, both being less than the current line rate. The decrease tolerance is less than the increase tolerance. The statistics on data rates are generated in real time. When the current data rate is less than the set decrease tolerance for a period longer than a preset duration, the current line rate will be decreased. When the current data rate is greater than or equal to the increase tolerance and less than or equal to the current line rate for a period longer than a preset duration, the current line rate will be increased.

Furthermore, the current line rate may be decreased more particularly as described in the following cases.

If the current data rate is 0 and the current line rate is greater than a preset minimum line rate $R_{low}$, the line rate will be decreased to $R_{low}$. If the current data rate is greater than 0 and less than 0.9*Rline (the first preset value), the line rate will be decreased by a first preset percentage (for example, 50 percent).

The current line rate may be increased more particularly as described in the following cases.

The system generates statistics on stop-write messages sent from the transport layer of the xDSL to the upper-layer entity. When the number of sent stop-write messages is greater than or equal to a preset threshold, the line rate will be increased to the maximum possible line rate of the xDSL. When the number of sent stop-write messages is less than a preset threshold (for example, 3), the line rate will be increased by a second preset percentage (for example, 70 percent).

In this way, no adverse effect is caused by too frequent adjustment of the line rate and the transmit power is reduced effectively.

To adjust the line rate includes adjusting the bit entry. To adjust the transmit power includes adjusting the gain entry or use the power back off (PBO) adjustment method.

Table 1 shows the bit entries:

TABLE 1

| $TONE_1$ | $TONE_2$ | $TONE_3$ | $TONE_4$ | ... | $TONE_{NSC-1}$ |
|---|---|---|---|---|---|
| $b_1$ | $b_2$ | $b_3$ | $b_4$ | ... | $b_{NCS-1}$ |

Each bit entry "b" represents the number of bits that can be carried on the corresponding sub-band tone on the xDSL. The standards stipulate that the value of each entry cannot exceed 15. The number of bits decides the line rate of the corresponding sub-band. The line rate of the sub-band can be changed by adjusting the bit entry.

In practice, one bit entry decides a unique line rate, and a line rate can be obtained through different bit entries.

Table 2 shows the gain entries:

TABLE 2

| $TONE_1$ | $TONE_2$ | $TONE_3$ | $TONE_4$ | ... | $TONE_{NSC-1}$ |
|---|---|---|---|---|---|
| $g_1$ | $g_2$ | $g_3$ | $g_4$ | ... | $g_{NSC-1}$ |

Each gain entry "g" represents the transmit power of data of the corresponding sub-band tone on the xDSL. The value of this transmit power decides the amount of data carried on the corresponding sub-band. The transmit power of data can be changed by adjusting the gain entry.

three functions: bit-swapping, dynamic rate repartitioning (DRR), and seamless rate adaptation (SRA). In the embodiments of the present invention, the line rate of the xDSL transceiver may be updated by updating the bit entry and the gain entry according to the process stipulated by such standards.

The transceiver on one side can determine a better group of bit entries and gain entries according to certain conditions and rules (such as the foregoing line rate policy), notify the peer transceiver through an OLR command, and finally switch the transceivers on both sides to the new bit entry and new gain entry at the same time according to the updated time sequence relationship, thus adjusting the line rate of the xDSL transceiver.

Other methods for updating the line rate of the xDSL transceiver can also be applied.

A process of adjusting the line rate and the transmit power according to the method provided in an embodiment of the present invention is described in detail below.

According to the current operation mode, the xDSL line is activated at a fixed rate in most cases, or activated at the maximum rate available from the line in a few cases. In the description below, the line rate before using this method is Rtarget; the corresponding bit entry is BITprim; a relatively low rate available from a line is Rlow; and the current line rate is Rline.

After statistics for m observance times, suppose that P is an average value of the m statistic results.

$$\frac{UD}{ID + UD}$$

The rules in Table 3 decide the new line rate and the update of bit entries and gain entries.

TABLE 3

| Statistic Result | Description | Rule | Update Method |
|---|---|---|---|
| P is less than 1. | The average data rate is less than the line rate. | P is between 1 and a, inclusive of a. | 1. No update. |
| | | P is between a and 0, exclusive of a and 0. | 2. Decrease the line rate by $\lfloor c \times P \rfloor$ times. |
| | | P is equal to 0. | 3. If $R_{line}$ is greater than $R_{low}$, decrease the line rate to $R_{low}$. |
| | | | 4. If $R_{line}$ is equal to $R_{low}$, no update is required. |
| P is equal to 1. | The data rate is equal to or greater than the line rate. | l is greater than or equal to b. | 5. Increase the line rate to $R_{target}$ in a single attempt. |
| | | l is less than b. | 6. Increase the line rate by $1 + \frac{1}{b}$ times. In particular, if the data rate is equal to the line rate, namely, 1 is equal to 0, the line rate is unchanged, which implies no update of the line rate. |
| | | | 7. If the line rate is equal to $R_{targe}$, no update is required. |

In step 203, the line rate of the xDSL transceiver is updated according to the adjusted line rate and transmit power.

Those skilled in the art will appreciate that the standards such as ADSL, ADSL2, ADSL2+ and VDSL2 elaborate on the on-line reconfiguration (OLR) process. The OLR covers "a" has the value of 0.85 in the above table, but may have any other value in practice as required. "b" has the value of 20 in the above table but may have any other value, depending on the time "t". "c" has the value of 1.1 in the above table but may have any other value as required.

Figure 3:
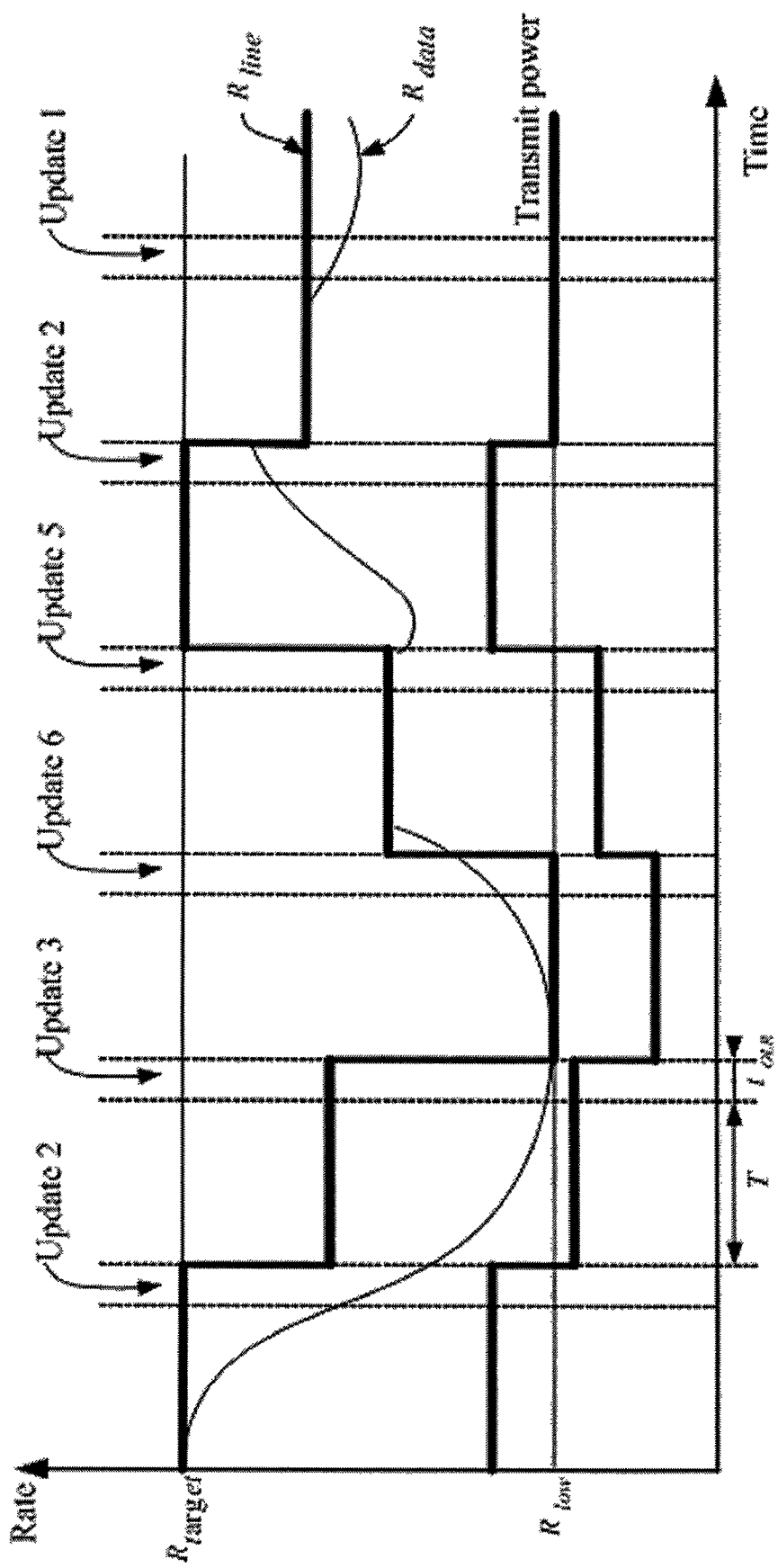
FIG. 3 shows the line rate adjustment according to a first embodiment of the present invention.

FIG. 3 illustrates a graphical representation of the foregoing adjustment rules.

In FIG. 3, T=m·t is the test time and tOLR is the system rate update time. Each update process corresponds to an update rule in Table 3.

As seen in FIG. 3, when the data rate is decreased to the level of update 2, the conditions of update method 2 in Table 3 are met and the line rate will be decreased. When the data rate is decreased to 0 (level of update 3), if the current line rate is greater than the lowest rate Rlow available from the line, the line rate will be decreased to Rlow. After a period, more data streams are transmitted on the line. According to the number of stop-write messages sent from the xDSL transceiver to the upper-layer entity, when the data rate reaches a certain value (level of update 6 shown in FIG. 3), the line rate will be increased. If the number of stop-write messages sent from the xDSL transceiver to the upper-layer entity exceeds a certain value (level of update 5 shown in FIG. 3), the line rate will be increased to the maximum line rate Rtarget available from the line in a single attempt. After the line rate is increased to Rtarget, the increase of the data rate is not evident, and the conditions of update method 2 in Table 3 are met. In this case, the line rate will be decreased to a certain value. Afterward, the data rate continues decreasing slowly, but still falls in a certain range, and the conditions of update 1 in Table 3 are met. In this case, the line rate will be unchanged.

In the cases of update 2 or update 6, the line rate is changed by multiplying a proportional divisor. The sum of bits loaded to each bit entry is multiplied by a proportional divisor to obtain the total number of bit tables required. Then the number of bits loaded to certain tones is increased or decreased on the basis of the current bit table, or certain tones are added or closed, to meet the total number of bit tables required. (Alternatively, on the basis of the original bit entry BITprim, the number of bits loaded to certain tones is decreased or certain tones are closed to make the total number of bits carried on the new bit entry meet the requirements.)

After the bit entry is updated, the gain entry will be updated accordingly. In the update process, the bit error ratio (BER) tolerance and signal-to-noise ratio (SNR) tolerance required by the standards must be satisfied.

Alternatively, the rules in Table 4 decide the new line rate and the update of bit entries and gain entries.

"c" has the value of 1.1 in the above table but may have any other value as required. "e" is the rate decrease tolerance and may have the value of 0.85 or any other value as required. "f" is the rate decrease tolerance and may have the value of 0.95 or any other value as required. "," is the duration.

Figure 4:
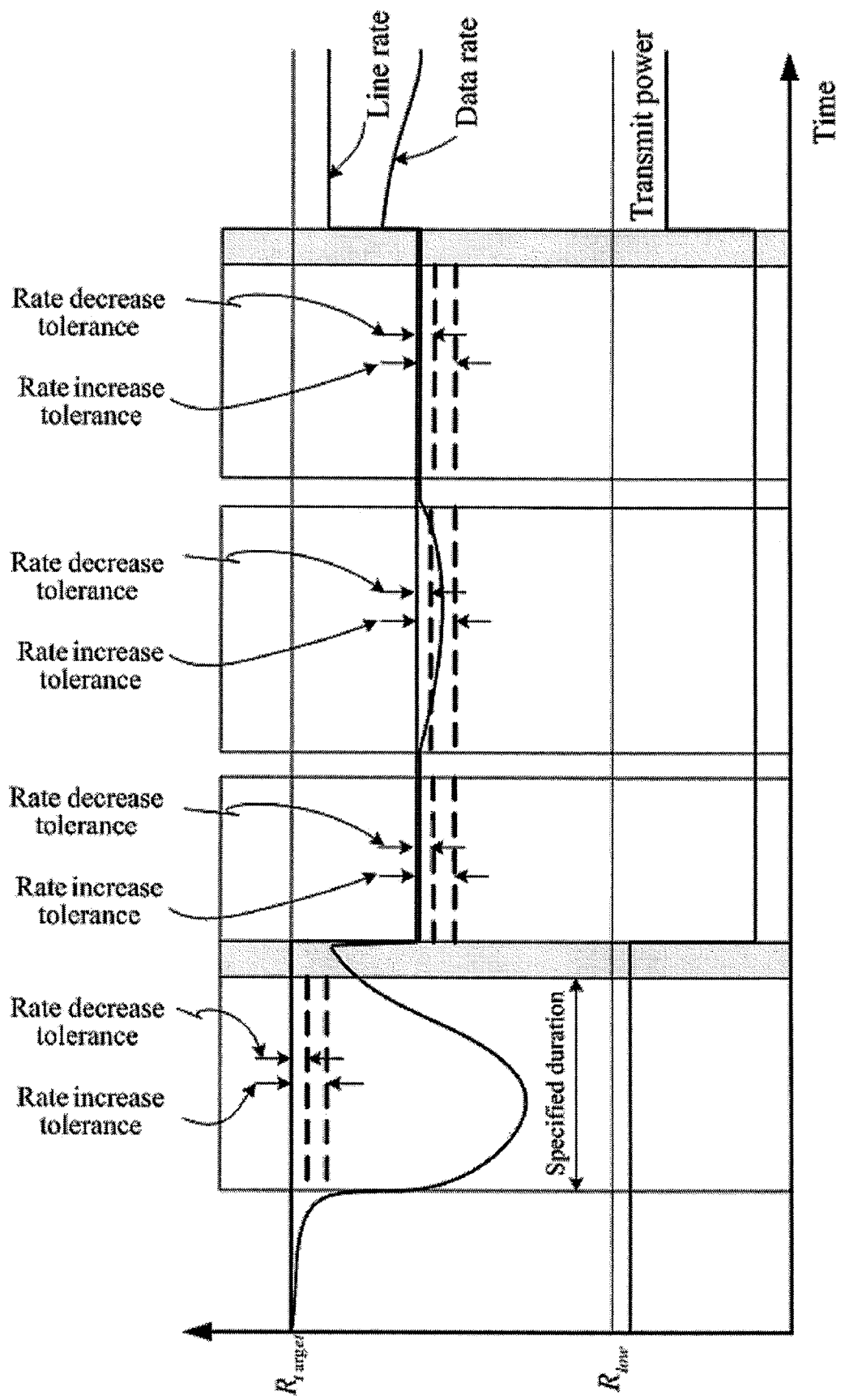
FIG. 4 shows the line rate adjustment according to a second embodiment of the present invention.

FIG. 4 illustrates a graphical representation of the foregoing adjustment rules.

As shown in FIG. 4, the line rate should be decreased if the data rate is lower than the actual line rate and has been lower than the decrease tolerance for a specified duration. The line rate should not be adjusted if the data rate approaches the actual line rate range but has not been higher than the increase tolerance for a specified duration. The line rate should not be adjusted if the data rate has been lower than the actual line rate for a specified duration but is not lower than the decrease tolerance. The line rate should be increased if the data rate approaches the actual line rate range and has been higher than the increase tolerance for a specified duration.

Figure 5:
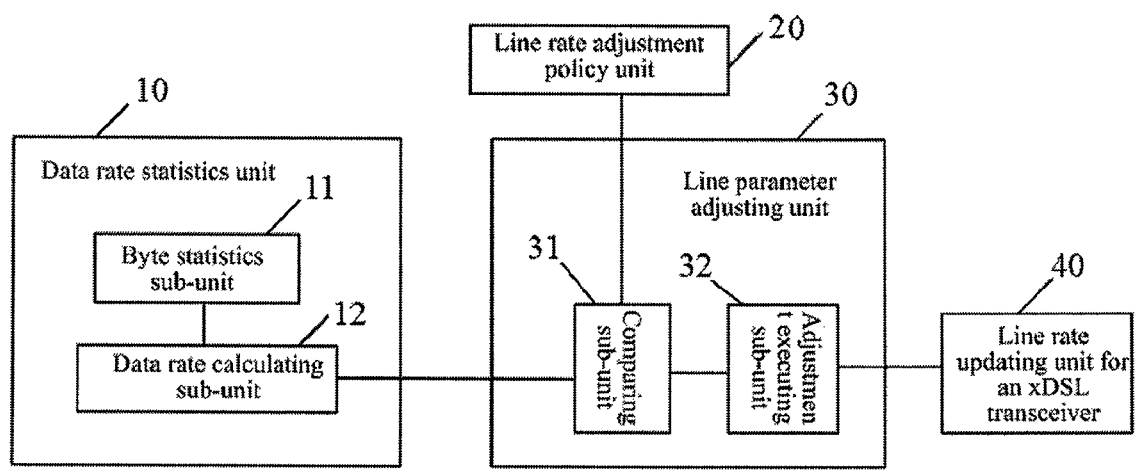
FIG. 5 shows the structure of an apparatus according to an embodiment of the present invention.

FIG. 5 shows the structure of an apparatus according to an embodiment of the present invention.

The apparatus includes a data rate statistics unit 10, a line rate adjustment policy unit 20, a line parameter adjusting unit 30, and a line rate updating unit 40 for an xDSL transceiver. The data rate statistics unit 10 is adapted to generate statistics on data rates on the xDSL. The line rate adjustment policy unit 20 is adapted to set a line rate adjustment policy The line parameter adjusting unit 30 is adapted to adjust the line rate and the transmit power based on the statistic results of the data rate statistics unit and the line rate set by the line rate adjustment policy unit. The line rate updating unit 40 for an xDSL transceiver updates the line rate of the xDSL transceiver through the OLR function according to the adjusted line rate and transmit power.

The data rate statistics unit 10 generates real-time statistics on data rates on the xDSL, and then the line parameter adjusting unit 30 decides whether the statistic results meet the conditions of the adjustment policy set in the line rate adjustment policy unit 20 such as the adjustment policy described in Table 3 or Table 4 above. If the conditions of the adjustment policy are met, the line rate and transmit power will be adjusted. The line rate updating unit 40 for an xDSL transceiver will update the line rate of the xDSL transceiver through the OLR function.

TABLE 4

| Statistic Result | Description | Rule | Update Method |
|---|---|---|---|
| P is less than e. | The average data rate is less than the line rate. | The duration is greater than τ. | 1. Decrease the line rate by ⌊c × P⌋ times.<br>2. If $R_{line}$ is greater than $R_{low}$, decrease the line rate to $R_{low}$.<br>3. If $R_{line}$ is equal to $R_{low}$, no update is required. |
|  |  | The duration is less than τ. | 4. No update. |
| P is less than or equal to 1 and greater than or equal to f. | The data rate is equal to or greater than the line rate. | The duration is greater than τ. | 5. If $R_{line}$ is less than $R_{target}$, the line rate will be increased by a fixed adjustment delt. Accordingly a fixed carried bit number $B_{delt}$ will be added to the bit entry. If the line rate is greater than $R_{target}$ after adding the $B_{delt}$, the line rate should be changed to $R_{target}$ directly.<br>6. If $R_{line}$ is equal to $R_{target}$, no update is required. |
|  |  | The duration is less than τ. | 7. No update. |
| P is less than f and greater than or equal to e. | The average data rate is less than the line rate. |  | 8. No update. |

Real-time statistics on data rates may be made according to the percentage of idle data (ID) bytes to non-idle data (UD) bytes on the line in a time period. The current data rate can also be obtained in other ways.

FIG. 5 depicts an implementation mode, namely, setting a byte statistics sub-unit 11 and a data rate calculating sub-unit 12 in the data rate statistics unit 10. The byte statistics sub-unit 11 is adapted to make statistics on ID bytes and UD bytes in a preset time period. The data rate calculating sub-unit 12 is adapted to calculate the data rate in a preset time period according to the statistics on ID bytes and UD bytes made by the byte statistics sub-unit.

If the current data rate is estimated in other ways, the data rate statistics unit 10 may be implemented in other modes.

Likewise, the line rate and the transmit power may be adjusted in different ways. For example, the most common modes are to adjust the bit entry and the gain entry. In this embodiment, the line parameter adjusting unit 30 includes a comparing sub-unit 31 and an adjustment executing sub-unit 32. The comparing sub-unit 31 is adapted to compare whether the statistic results of the data rate statistics unit meet the conditions of the line rate adjustment policy set by the line rate adjustment policy unit. The adjustment executing sub-unit 32 is adapted to update the bit entry and the gain entry according to the comparison result of the comparing sub-unit.

In this way, through real-time adjustment of the bit entry and the gain entry, the line rate updating unit 40 for an xDSL transceiver can update the line rate of the xDSL transceiver according to the updated bit entry and gain entry, make the line rate adaptable to the change of the data rate, and reduce the transmit power effectively.

Although the invention has been described through some exemplary embodiments, the invention is not limited to such embodiments. It is apparent that those skilled in the art can make various modifications and variations to the invention without departing from the spirit and scope of the invention. The invention is intended to cover the modifications and variations provided that they fall in the scope of protection defined by the following claims or their equivalents.

What is claimed is:

1. A method for saving power on a digital subscriber line (xDSL), comprising:
    generating, by a data rate statistic unit, a statistic result on data rates on the xDSL;
    adjusting, by a line parameter adjustment unit, a line rate and a transmit power on the xDSL according to the statistic result; and
    updating, by a line rate updating unit, a line rate of an xDSL transceiver according to the adjusted line rate and the transmit power;
    wherein the process of adjusting the line rate and the transmit power on the xDSL according to the statistic result comprises:
    setting a line rate adjustment policy; and
    when the statistic result meet the conditions of the set line rate adjustment policy, updating a bit entry and a gain entry corresponding to the xDSL line.

2. The method of claim 1, wherein the process of generating a statistic result on data rates on the xDSL comprises:
    generating the statistic result on idle data (ID) bytes and non-idle data (UD) bytes in a preset time period; and
    calculating the data rate in the preset time period based on an equation:

$$R_{data} = R_{line} \times \frac{UD}{ID+UD}$$

wherein, $R_{line}$ is a current line rate.

3. The method of claim 2, wherein the process of generating the statistic result on data rates on the xDSL comprises: taking the average value of the data rates in a continuous preset number of statistics times as a current data rate.

4. The method of claim 1, wherein the process of setting a line rate adjustment policy comprises:
    generating the statistic result on data rates periodically;
    when a current data rate is less than a current line rate according to the statistic result, decreasing the current line rate; and
    when the current data rate is greater than or equal to the current line rate according to the statistic result, increasing the current line rate.

5. The method of claim 1, wherein the process of setting a line rate adjustment policy comprises:
    setting a decrease tolerance and an increase tolerance, both being less than a current line rate, with the decrease tolerance being less than the increase tolerance;
    decreasing the current line rate when a current data rate has been less than the decrease tolerance for a specified duration; and
    increasing the current line rate when the current data rate is less than or equal to the current line rate and has been greater than or equal to the increase tolerance for a specified duration.

6. The method of claim 5, wherein the process of decreasing the current line rate comprises:
    decreasing the line rate to $R_{low}$ when the current data rate is zero and the current line rate is greater than a preset minimum line rate $R_{low}$; and
    decreasing the line rate by a certain percentage when the current data rate is greater than zero and less than a first preset value.

7. The method of claim 5, wherein the process of increasing the current line rate comprises:
    generating statistics on stop-write messages sent from a transport layer of the xDSL to an upper-layer entity; and
    increasing the line rate to the maximum line rate of the xDSL when a number of sent stop-write messages is greater than or equal to a preset threshold;
    increasing the line rate by a second preset percentage when the number of sent stop-write messages is less than the preset threshold.

8. The method of claim 1, wherein the process of updating the line rate of an xDSL transceiver comprises:
    updating the line rate of the xDSL transceiver through an online reconfiguration (OLR) function according to at least one of the adjusted line rate or transmit power.

9. An apparatus for saving power on a digital subscriber line (xDSL), comprising:
    a data rate statistics unit configured to generate a statistic result on data rates on the xDSL;
    a line rate adjustment policy unit configured to set a line rate adjustment policy;
    a line parameter adjusting unit configured to adjust at least one of the line rate or a transmit power according to the statistic result of the data rate statistics unit and the line rate set by the line rate adjustment policy unit; and
    a line rate updating unit for an xDSL transceiver, configured to update the line rate of the xDSL transceiver through an online reconfiguration (OLR) function according to the adjusted line rate and transmit power.

10. The apparatus of claim 9, wherein the data rate statistics unit comprises:
    a byte statistics sub-unit configured to generate the statistic result on idle data (ID) bytes and non-idle data (UD) bytes in a preset time period; and a data rate calculating sub-unit configured to calculate the data rate in a preset time period according to the statistic result on ID bytes and UD bytes made by the byte statistics sub-unit.

11. The apparatus of claim 9, wherein the line parameter adjusting unit comprises:
a comparing sub-unit configured to compare whether the statistic result of the data rate statistics unit meet conditions of the line rate adjustment policy set by the line rate adjustment policy unit; and
an adjustment executing sub-unit configured to update a bit entry and a gain entry according to the comparison result of the comparing sub-unit.

12. A digital subscriber line access multiplexer, comprising:
an apparatus for saving power, the apparatus configured to:
generate a statistic result on data rates on an xDSL;
set a line rate adjustment policy;
adjust at least one of the line rate or a transmit power according to the statistic result of the data rate statistics unit and the line rate set by the line rate adjustment policy unit; and
update the line rate of an xDSL transceiver through an online reconfiguration (OLR) function according to the adjusted line rate and the transmit power.

* * * * *